United States Patent [19]
Mudd

[11] Patent Number: 5,287,770
[45] Date of Patent: Feb. 22, 1994

[54] DIE CAST TRANSMISSION HOUSING FOR ROTOTILLER

[75] Inventor: George W. Mudd, Baltimore, Md.

[73] Assignee: Schiller-Pfeiffer, Inc., Southampton, Pa.

[21] Appl. No.: 981,577

[22] Filed: Nov. 25, 1992

[51] Int. Cl.⁵ .......................... F16H 57/02; F16H 1/16
[52] U.S. Cl. ........................................ 74/606 R; 74/425
[58] Field of Search .................. 74/606 R, 425, 625, 74/89.14, 505, 545

[56] References Cited

U.S. PATENT DOCUMENTS

| | | |
|---|---|---|
| 2,679,200 | 5/1954 | Johnson et al. |
| 2,755,718 | 7/1956 | Arndt . |
| 2,847,924 | 8/1958 | Quick . |
| 2,864,293 | 12/1958 | Edrich et al. . |
| 2,908,337 | 10/1959 | Surprise et al. . |
| 3,123,149 | 3/1964 | White . |
| 3,202,004 | 8/1965 | Field . |
| 3,442,335 | 5/1969 | Silbereis et al. . |
| 3,452,823 | 7/1969 | Shapland, Jr. . |
| 4,250,968 | 2/1981 | Fox . |
| 4,421,176 | 12/1983 | Tuggle et al. . |
| 4,643,044 | 2/1987 | Bitton ........................ 74/606 R |
| 4,930,367 | 6/1990 | Nagasawa ................. 74/606 R X |
| 4,932,289 | 6/1990 | Bitcon ........................ 74/606 R |
| 5,027,670 | 7/1991 | Adam .............................. 74/425 |
| 5,035,155 | 7/1991 | Robledo .................. 74/606 R X |
| 5,056,213 | 10/1991 | Behnke et al. .......... 74/606 R X |
| 5,099,717 | 3/1992 | Ochiai et al. ................ 74/425 X |
| 5,161,431 | 11/1992 | Watanabe ..................... 74/425 X |
| 5,212,999 | 5/1993 | Kitada ............................ 74/425 |
| 5,218,886 | 6/1993 | Louis et al. ................. 74/606 R |
| 5,220,854 | 6/1993 | Allart et al. ................. 74/606 R |

FOREIGN PATENT DOCUMENTS

| | | | |
|---|---|---|---|
| 1264769 | 5/1961 | France ............................ 74/425 |
| 2254898 | 10/1992 | United Kingdom ............ 74/606 R |

Primary Examiner—Vinh T. Luong
Attorney, Agent, or Firm—Caesar, Rivise, Bernstein, Cohen & Pokotilow, Ltd.

[57] ABSTRACT

A two-piece, die cast transmission housing for a rototiller. The housing comprises two sections that are bolted together along their peripheral edges. A preformed gasket is seated within a recess in one section to form a tight seal between the two peripheral edges when the sections are secured together. The two-section design allows for easier maintenance, repair and replacement of transmission components without damaging bearings or seals. The two-section design also eliminates the need for alignment holes, potential sources of leaks, because the alignment can occur before the primary components are enclosed inside the housing. The housing sections include plural intersecting ribs which reinforce the housing and effectively dissipate heat.

9 Claims, 5 Drawing Sheets

DIE CAST TRANSMISSION HOUSING FOR ROTOTILLER

BACKGROUND OF THE INVENTION

This invention relates generally to rototillers and cultivators for gardening, and more particularly to the transmission housing for such devices.

Rototiller devices are commercially available for home gardening applications. Such devices dig up and turn over top soil by the use of mechanically driven disks containing teeth on the disks' periphery. These rotating disks, known as tines, dig into the earth and turn over soil at that location in order to prepare the soil for planting. Although rototiller design may vary, usually the rototiller rests upon the tines. Because these tines are driven to rotate, in order to dig and tear up the soil, the rototiller tends to crawl in the direction of the spinning tines when the tines engage the ground.

Power for such prior art rototillers usually is provided by an engine, be it gasoline powered or electric powered. In either case, the engine operates through a transmission to rotate the tined axle.

The rototiller is guided in its action by the operator through the use of a pair of handle bars that may or may not support a clutch control means to engage the engine and tined shaft. As with any transmission, a lubricating system is required to minimize wear of the intermeshing gear parts. Lubricating material (e.g., grease or oil) must be retained and/or replaced periodically to maintain transmission operation. However, alignment holes and lubrication injection ports within the housing increase the likelihood of lubrication material leakage through these apertures. Moreover, the tined axle itself is a source of leakage since the axle must be free to rotate even though it is directly coupled to the transmission.

The following constitute examples of various types of prior art rototillers' or cultivators' transmissions suitable for home garden tilling/cultivating applications found in the following U.S. Pat. Nos.: 2,679,200 (Johnson); 2,755,718 (Arndt); 2,847,924 (Quick); 2,864,293 (Edrich et al.); 2,908,337 (Surprise); 3,202,004 (Field); 3,123,149 (White); 3,442,335 (Silbereis et al.); 3,452,823 (Shapland, Jr.); 4,250,968 (Fox) and 4,421,176 (Tuggle et al.).

The clutch mechanisms used with the rototiller transmissions vary. For example, some utilize belt/pulley tension clutches, while others use centrifugal clutches or spring loaded clutches to engage or disengage or even reverse tined axle motion. Such designs can increase the size of the transmission housing or adjacent housing in order to accommodate the clutch.

One particularly effective rototiller for home gardening applications is sold by the Mantis Manufacturing Company of Huntingdon Valley, Pennsylvania under the trademark MANTIS TILLER/CULTIVATOR. This rototiller utilizes a gasoline powered engine to drive a worm gear transmission to rotate plural tined blades mounted on a common axle. The worm gear transmission is housed in a unitized compartment such that the primary components (e.g., a drive shaft, worm shaft and worm gear) are mounted and permanently enclosed within this compartment at the factory. This unitized design requires that openings in the housing be provided so that the primary components can be assembled inside the housing. This is accomplished by inserting the drive shaft through the top opening of the housing, while the worm shaft is inserted through an aperture in the bottom. The worm gear is inserted through the main housing opening and then the tined axle is inserted through the tined axle aperture and screwed into the worm gear center threading.

While the transmission housing is generally suitable for its intended purposes, it nevertheless leaves something to be desired from the standpoints of ease of assembly, ease of adjustment or maintenance of the transmission components, and long term resistance to lubrication leakage or loss. For example, with regard to initial assembly, there is no direct access to the worm shaft, worm gear or drive shaft. Thus, alignment of these components can only be monitored through the various openings through which these components were placed into the housing. Moreover, adjustments or corrections can only be accomplished by releasing the tined axle to free up primary component movement.

With regard to maintenance, any primary component needing repair or replacement requires removal of the tined axle. This latter step cannot be accomplished without damaging the tined axle bearings and seals. If, in the process of releasing the tined axle, the housing is scored or damaged the usual result is that any new seals or bearings installed will not seal as tightly as before the maintenance work was conducted.

With regard to the transmission housing, the main housing cover acts as a potential source of lubrication leakage. Since the worm gear must be introduced through this opening, alignment checked through this opening and customer maintenance (including adding lubrication) is accomplished through this opening, all of these increase the chance that this opening may leak.

Another commercially available rototiller for home gardening applications is that sold under the trademark "LI'L HOE" by Hoffco, Inc., of Richmond Indiana. This rototiller includes a die cast transmission housing formed of two components or sections which are screwed together to form an interior chamber in which the transmission components are located. The axle for the rototiller's blades extends through bushing mounted in the housing sections. Plural strengthening fins extend outward radially from the openings in the housing sections in which the axle bearings are located. In order to prevent the leakage of the internal lubrication a bead of a sealant or caulk is provided on the engaging surfaces of the two housing sections. Each housing section also includes a horizontal recess therein for receipt of the lower portion of a respective one of the rototiller's handle bars. Each recess includes a stop surface to ensure that the handle bar is mounted in the desired direction on the housing.

OBJECTS OF THE INVENTION

It is a general object of this invention to provide a transmission housing for a rototiller that exhibits advantages over the prior art.

It is a another object of this invention to provide a rototiller transmission housing that is easy to assemble and disassemble.

It is still another object of this invention to provide a rototiller transmission housing that is resistant to leakage of the transmission's lubrication.

It is still another object of this invention to provide a rototiller transmission housing that facilitates the original alignment of the transmission's primary components before final assembly.

It is a further object of this invention to provide a rototiller transmission housing that facilitates transmission repair, maintenance and the checking of alignment of the primary components following the repair.

It is still a further object of this invention to provide a rototiller transmission housing with an enhanced heat dissipation quality while simultaneously reinforcing the housing against cracking due to transmission vibration.

It is still a further object of this invention to increase the life cycle of the transmission by this improved design.

SUMMARY OF THE INVENTION

These and other objects of the invention are achieved by providing a transmission for a rototiller apparatus. The transmission comprises a pair of housing sections, gasket means, a drive shaft, a worm shaft, and a worm gear. Each of the housing sections has an outer surface and inner surface, with the inner surface terminating in a peripheral engagement surface.

Each of the housing sections is preferably formed of a die cast material and includes a plurality of strengthening and heat dissipating ribs projecting from its outer surface. The ribs intersecting one another over a substantial portion of the housing section.

One of the peripheral engagement surfaces of one of the housing sections includes a groove extending the length of that peripheral engagement surface. The gasket means comprises a preformed gasket formed of a resilient material which is disposed within the groove and extends along the entire length of the peripheral engagement surface.

The housing sections are secured together by releasable fastening means, whereupon the inner surfaces of the housing sections form therebetween an interior chamber in which the drive shaft, the worm shaft, the worm gear, and a flowable lubricating material are located, and with the gasket being squeezed tightly between those peripheral engagement surfaces to form tight seal to prevent the egress of the flowable lubricating material therethrough.

DETAILED DESCRIPTION OF THE PREFERRED EMBODIMENT

Figure 1:
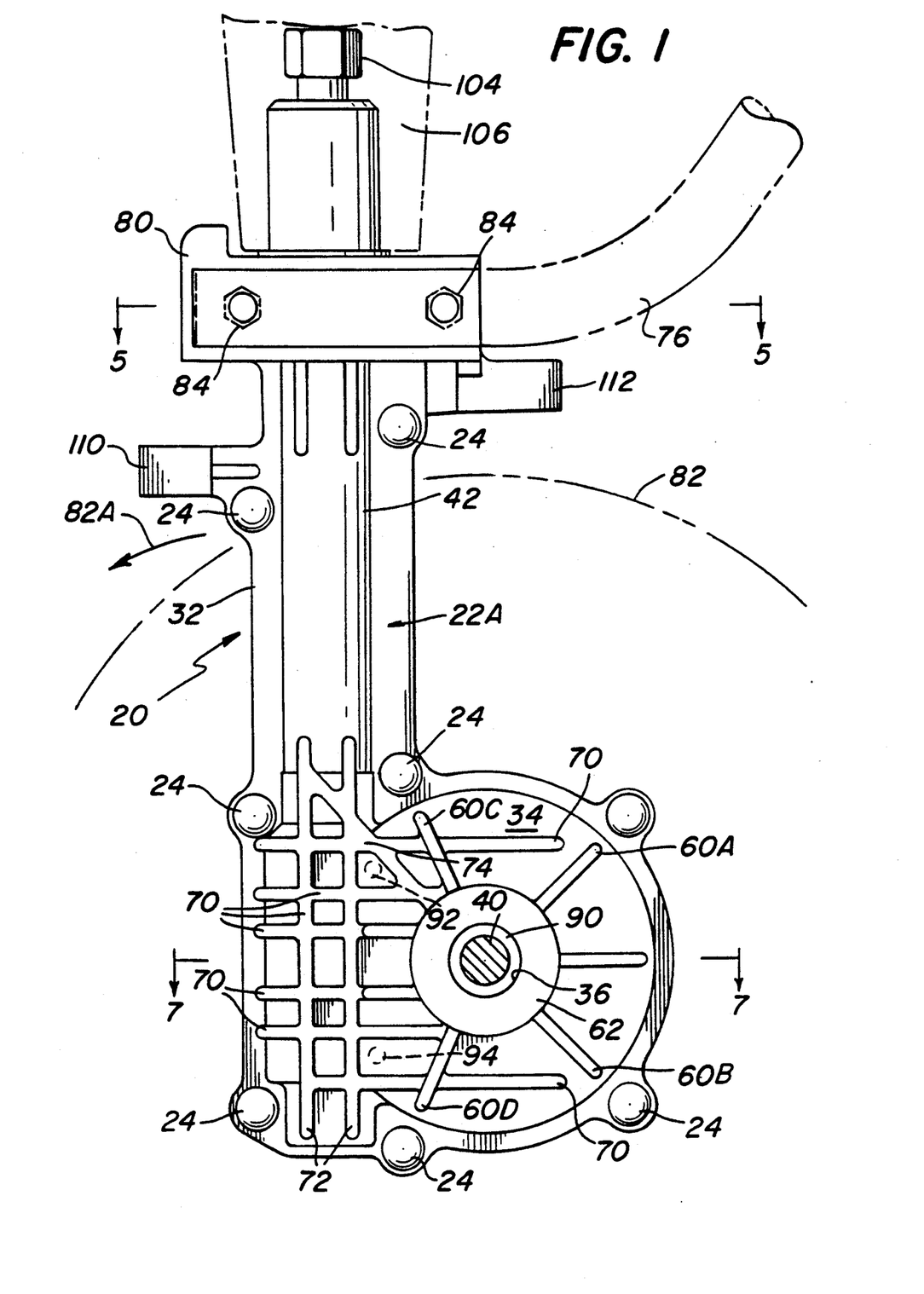
FIG. 1 is a side elevational view of one side of the die cast aluminum transmission housing of this invention.
Figure 2:
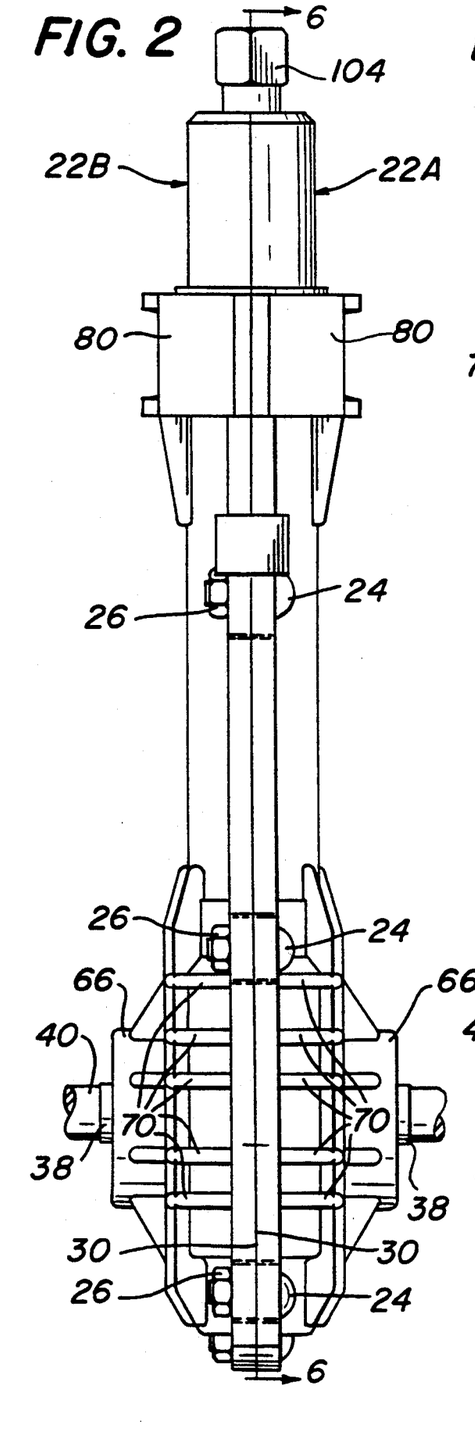
FIG. 2 is a front elevational view of the transmission housing shown in FIG. 1.

Referring now to the various figures of the drawings wherein like reference numerals refer to like parts, there is shown at 20 in FIG. 1 one side, e.g., the left side, of a transmission housing constructed in accordance with this invention. The transmission housing is of particular utility with the heretofore identified MANTIS TILLER/CULTIVATOR rototiller, but can be readily modified for use with other rototillers as well. Before describing the details of the housing 20 a brief description of it and its various features and advantages is in order. Thus, as will be seen later transmission housing is a of a two piece, die cast aluminum construction, i.e., it comprises two die cast sections 22A and 22B which are arranged to be releasably secured together by plural threaded fasteners.

The interior of each of the two housing sections includes a cavity such that when the two sections are joined the housing sections form a hollow interior chamber in which the transmission's components are located. The chamber provides sufficient room for rotation of the transmission components and to enable a lubrication material, e.g., grease, to flow therearound.

Since the housing is formed of the two sections 22A and 22B the alignment of the transmission's primary components, i.e., the drive shaft, the worm shaft, and the worm gear, can be checked before the two sections of the housing are connected by the threaded fasteners. Moreover, the replacement of any primary component of the transmission or any other internal component can be accomplished with little or no damage to the housing or to the bearings by simply disassembling the two sections of the housing. That is, the axle does not have to be forcefully driven out, as would be necessary with a unitized transmission casing in order to release the primary components for repair. Such forced removal of the axle damages axle bearings and seals and scores the axle/worm gear threads.

The two piece construction of the subject transmission housing eliminates the need for the two openings in the housing which has characterized the prior art MANTIS TILLER/CULTIVATOR rototiller: the main housing opening and the bottom opening for the worm shaft. Because every primary component can be easily positioned within the housing 20 before its two sections are secured together, there is no need to have an opening in it for installing the worm gear, nor an opening in the bottom for installing the worm shaft. The elimination of these two openings reduces the potential for lubrication leakage.

The transmission housing of this invention includes a closed transmission lubrication system which is resistant to leakage. In this regard the transmission housing 20 includes a preformed gasket, e.g., a gasket of circular cross-section formed of a resilient material, (to be described later) which is fitted into a groove provided along the periphery of the inner surface of one of the housing sections. The periphery of the inner surface of each of the housing sections are arranged to be brought into abutment with each other when the housing is assembled with the gasket tightly interposed therebetween to prevent the lubrication material, e.g., grease, from leaking out. This "closed" lubrication system eliminates the need for a housing cover, as has characterized the prior art MANTIS TILLER/CULTIVATOR rototiller, thereby reducing the potential for leaks while increasing gear life.

Moreover, as will be seen later the seal for the rototiller's tined axle is made more leak resistant than the prior art MANTIS TILLER/CULTIVATOR rototiller by use of a lip seal in the form of a non-spring loaded seal. In this regard the prior art MANTIS TILLER/CULTIVATOR rototiller uses a rubber gasket in conjunction with a metal retainer. Because access to the primary components of the subject transmission housing will not require removal of the tined axle from outside the housing (i.e., access is provided by merely unbolting the two sections 22A and 22B), the tined axle/housing interface can have a tighter fit.

In order to enable the rototiller's transmission to run cooler, the housing 20 of this invention utilizes plural fins (to be described later) which extend over a substantial portion of the exterior surface of the housing. These fins not only enhance the housing's heat dissipating qualities, but also enhance its strength and resistance to damage, which could result from operational vibrations or impact during operation.

Moreover, the two piece nature of the transmission housing 20 provides manufacturing economies. In this regard during manufacturing should one section of the housing contain a flaw, only that flawed section need be discarded and a new section selected. This is to be contrasted with a one piece transmission housing wherein the casting requires the pouring of molten metal and potentially the disposal of the entire casting if just one portion of the casting is faulty. Further still, tolerances for every facet of the housing design (dimensions for bosses, ribs, screw holes, etc.) can be better controlled during the die cast manufacturing of a two component housing, as compared to the manufacturing of a one piece cast housing.

As will also be described later the housing of this invention includes means for ensuring that the rototiller's handle bars, which are to be secured and mounted on the transmission housing, are oriented in the proper direction in the interest of operator safety.

As mentioned earlier the subject transmission housing is particularly suited for use with the MANTIS TILLER/CULTIVATOR rototiller. That rototiller makes use of a clutch assembly which is located in the motor housing. Thus, when the transmission housing 20 of this invention is used with such a rototiller the transmission housing can be relatively simple in construction since it need not accommodate the clutch assembly. A further advantage of this arrangement is the fact that any clutch failure and repair does not require the disassembly of the transmission housing and its components.

Because the primary components (i.e., the drive shaft, worm shaft and worm gear) used in the subject invention are the same as those used in the prior art MANTIS TILLER/CULTIVATOR rototiller, such a prior art device can be readily retrofitted with the improved transmission housing of this invention.

Referring now to the drawings, the details of the transmission housing 20 will now be described. The housing assembly 20, as noted earlier, includes a pair of sections 22A and 22B (FIGS. 1-4) which are arranged to be secured together by plural fasteners. In this case, the plural fasteners comprise a plurality of bolts 24 and associated nuts 26. The bolts 24 extend through aligned openings 28 (to be described later, see FIG. 6) at spaced locations along the periphery of the housing sections 22A and 22B.

The two housing sections 22A and 22B are of generally identical construction, and are mirror images of one another. However, there are some differences which will be described later. Thus, as can be seen in FIG. 1, the "left" housing section 22A basically comprises an elongated, vertically oriented portion 32, terminating at its bottom in a bulbous portion 34. The bulbous portion 34 projects from the rear side of the portion 32 and is of generally circular profile, and includes a central opening 36 therein. The central opening includes a bearing 38 (FIG. 7) mounted therein through which the axle 40 of the rototiller extends. It is on each end of the axle 40 that the tined blades (not shown) of the rototiller are mounted.

Figure 6:
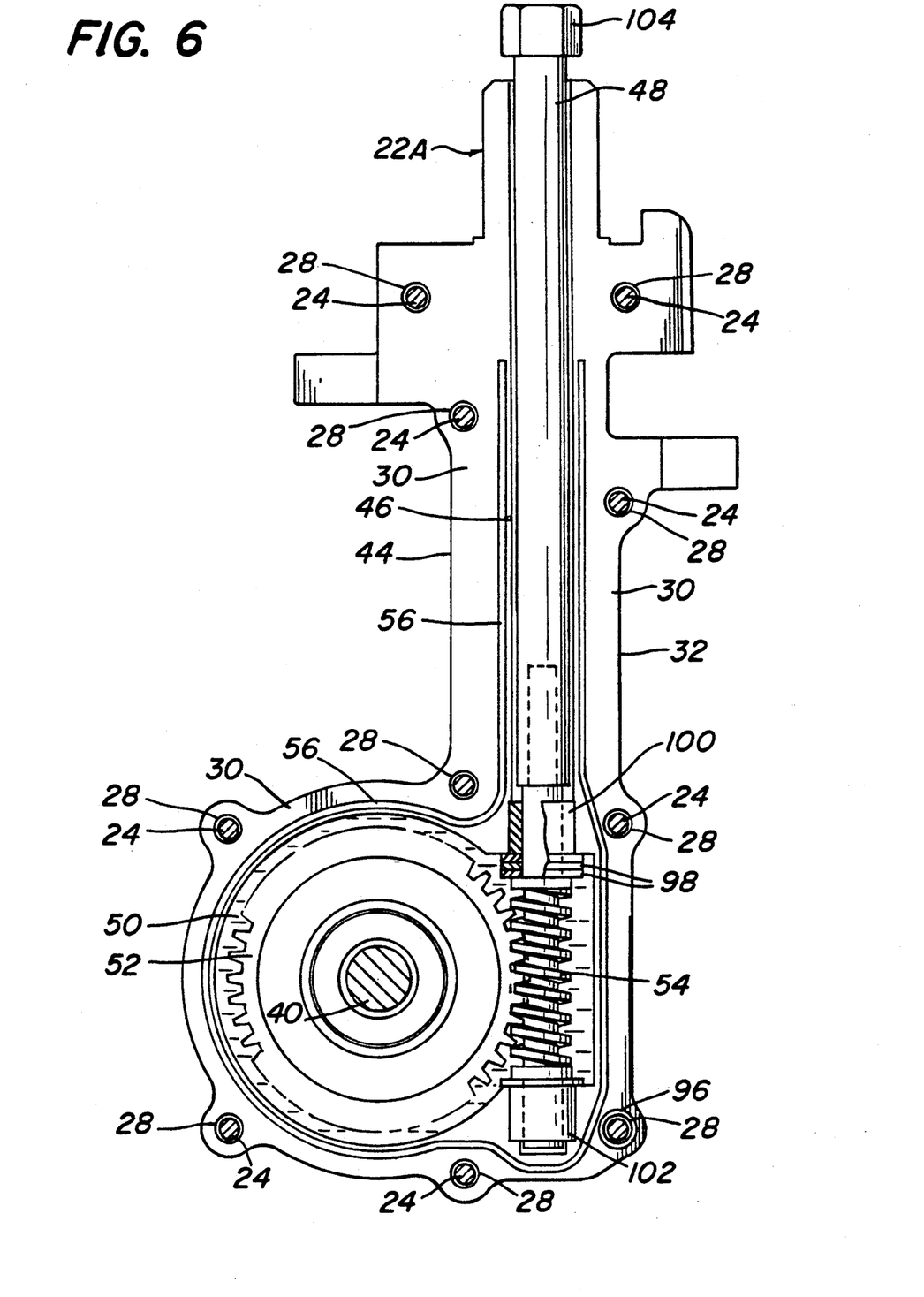
FIG. 6 is a side elevational view showing the location of the transmission components within the interior of the section of the aluminum housing shown in FIG. 1.

Each of the housing sections 22A and 22B includes an outer surface 42 (FIG. 1) and an inner surface 44 (FIG. 6). As can be seen in FIG. 6 an elongated recess 46 is provided in the vertically extending portion 32 of the inner surface 44 of the housing section to receive therein the drive shaft 48 of the transmission. Communicating with that recess 46 is a circular recess 50 in which the worm gear 52 of the transmission is located. The worm shaft 54 of the transmission is located at the interface of the vertically extending recess 46 and the circular recess 50 and is interconnected between the drive shaft 48 and worm gear 52.

The periphery of the inner surface 44 of the housing 22A is in the form of a flat engagement surface 30. This surface is arranged to abut the corresponding surface of the other housing section 22B.

Figure 7:
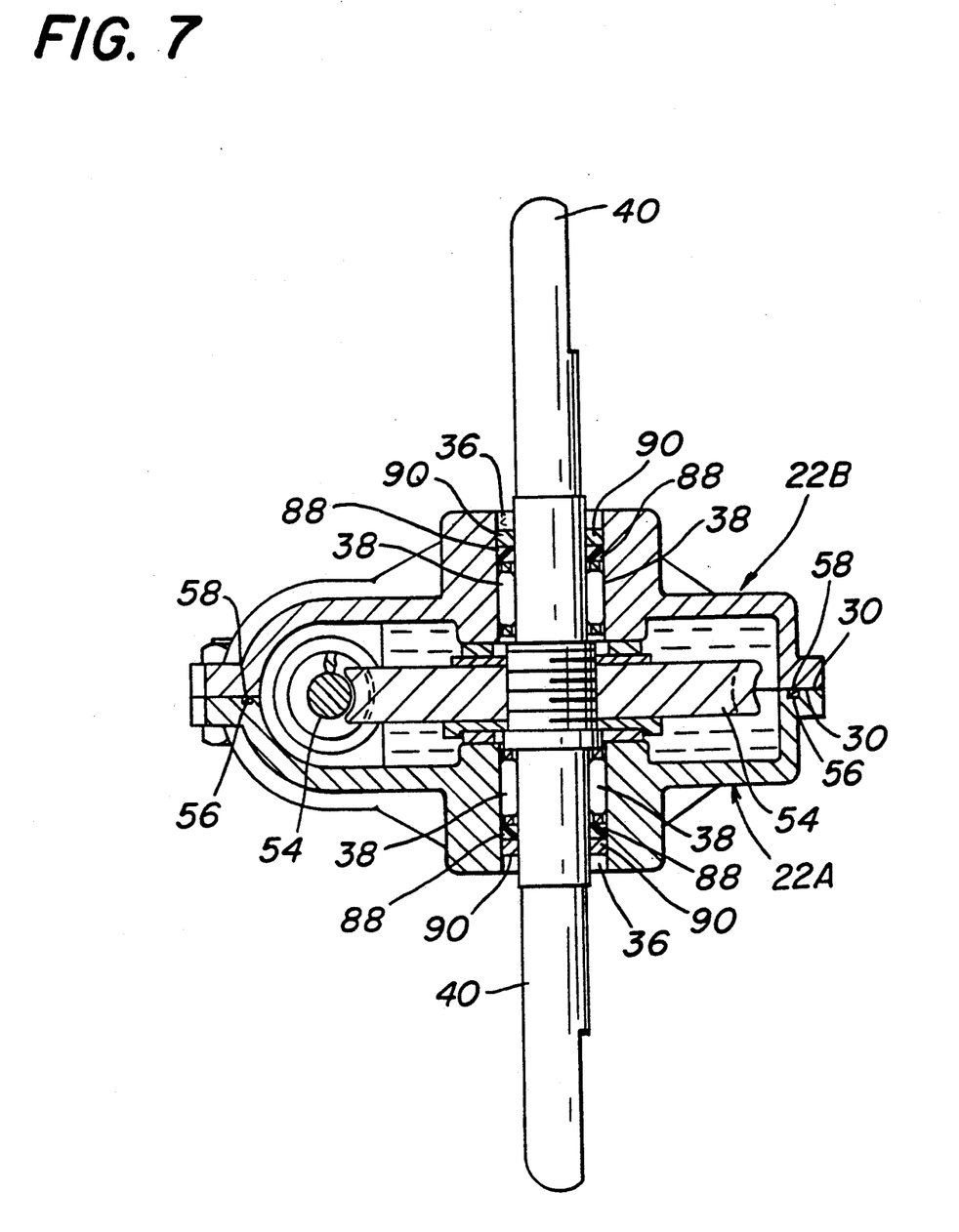
FIG. 7 a sectional view taken along line 7—7 of FIG. 1.

A lubricating medium, e.g. grease, 100 is provided within the interior of the housing, i.e., the space formed by the conjoining recesses of the two sections 22A and 22B and in which the transmission components are located. In order to ensure that the grease 100 does not gain egress from the interior space when the sections 22A and 22B are secured together, a sealing gasket is provided therebetween. In particular, a groove 56 is provided in the engagement surface 30 of the section 22A and extends along a major portion of the length thereof, as shown in FIG. 6. The groove is of rectangular cross section (FIG. 7). A preformed gasket 58 formed of a resilient material, e.g., rubber, and having a circular cross section is located in the groove 56. There is no corresponding groove in the other housing section 22B. A portion of the peripheral surface of the gasket 58 extends beyond the plane of the surface 30 when the gasket is within the groove.

As will be appreciated by those skilled in the art, when the gasket 58 is in place within the groove 56, and the two housing sections disposed so that their engagement surfaces 30 are immediately adjacent, and the bolts 24 and nuts 26 are tightened, the surfaces 30 of the two sections 22A and 22B abut with the gasket tightly squeezed therebetween. This action creates a good, fluid-tight seal to prevent the egress of grease 100 from out of the interior of the housing.

Because the apparatus 20 comprises two housing sections, 22A and 22B, the drive shaft 48, worm shaft 54 and the worm gear 52 can be easily positioned within either housing, e.g., within the left housing section 22A. In particular, plural spacers 98 (FIG. 6) are placed on the top of the worm shaft 54. A top roller bearing 100 is then fitted onto the top of the worm shaft 54. A bottom bearing 102 is then fitted onto the bottom of the worm shaft 54. Next, the worm shaft 54 is inserted into the drive shaft 48. The worm shaft 54/drive shaft 48 assembly is then positioned within the circular recess 50. Next, the worm shaft 54 and the worm gear 52 are intermeshed and positioned within the circular recess 50. Next, the axle 40 is screwed into the worm gear 52 and its alignment checked. Following the insertion of the gasket 58 into the groove and the addition of lubrication into the circular recess 50, the right housing section 22B can then be attached to the left housing section 22A by initially engaging the counterbore 96 (to be described later) at the lower end of the bulbous portion 34 of left housing section 22A with a raised boss (not shown) at the corresponding location of the right housing section 22B. This assembly procedure results in the sealing the drive shaft/worm gear/axle system without the need for alignment holes that would be necessary if the transmission housing were one piece.

As mentioned earlier and as can be seen clearly in FIGS. 1 and 2, the outer surface of each of the housing sections includes a plurality of strengthening and heat dissipating fins. In particular, there are four radially extending fins 60A, 60B, 60C, and 60D. These fins project radially outward from a raised boss 62. The boss contains the bearing 38, a lip seal and a retaining ring (to be discussed later) for the blade axle 40. The ribs 60A-60D serve to reinforce the boss 62 and in addition provide heat dissipation for the housing. The exterior of each housing section also includes plural transversely extending parallel ribs 70, a pair of vertically extending parallel ribs 72, and a diagonal rib 74. The ribs 60C and 60D intersect the top and bottom ribs 70 of the transverse ribs. The diagonal rib 74 intersects the top two transverse ribs 70 and both vertical ribs 72. The vertical ribs 72 intersect all of the transverse ribs 70. All of these ribs serve to dissipate heat and also provide additional strength to the housing, thereby rendering it resistant to damage from vibration during operation or in the event the housing is impacted by some buried structure during the use of the rototiller.

Figure 3:
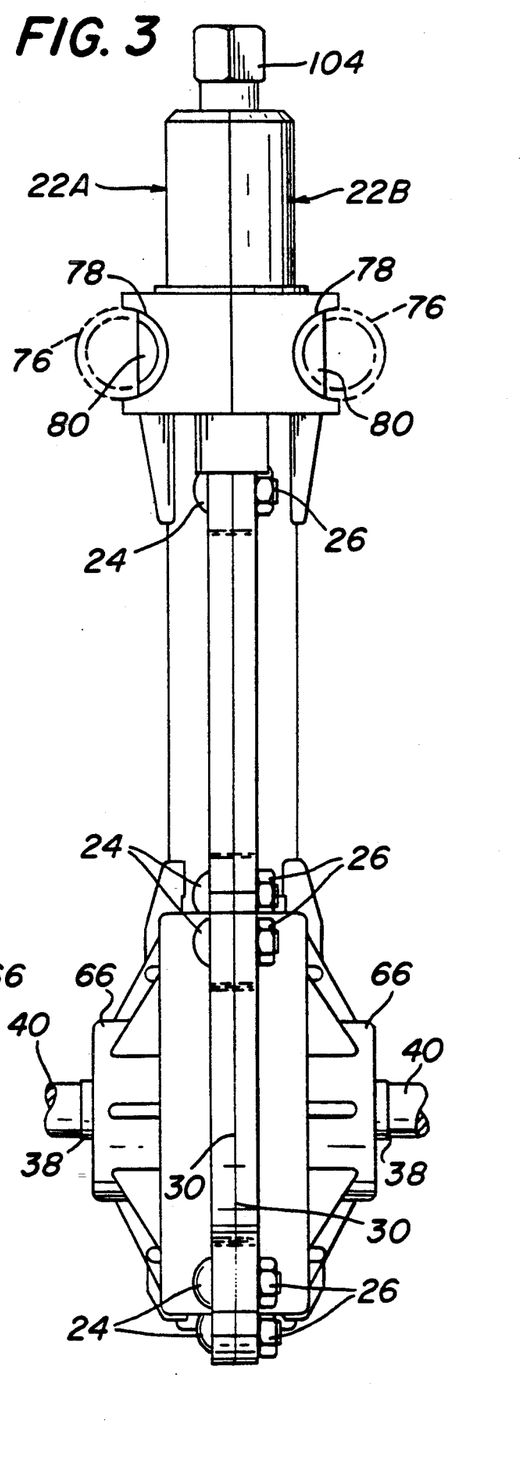
FIG. 3 is a rear elevational view of the transmission housing shown in FIG. 1.
Figure 4:
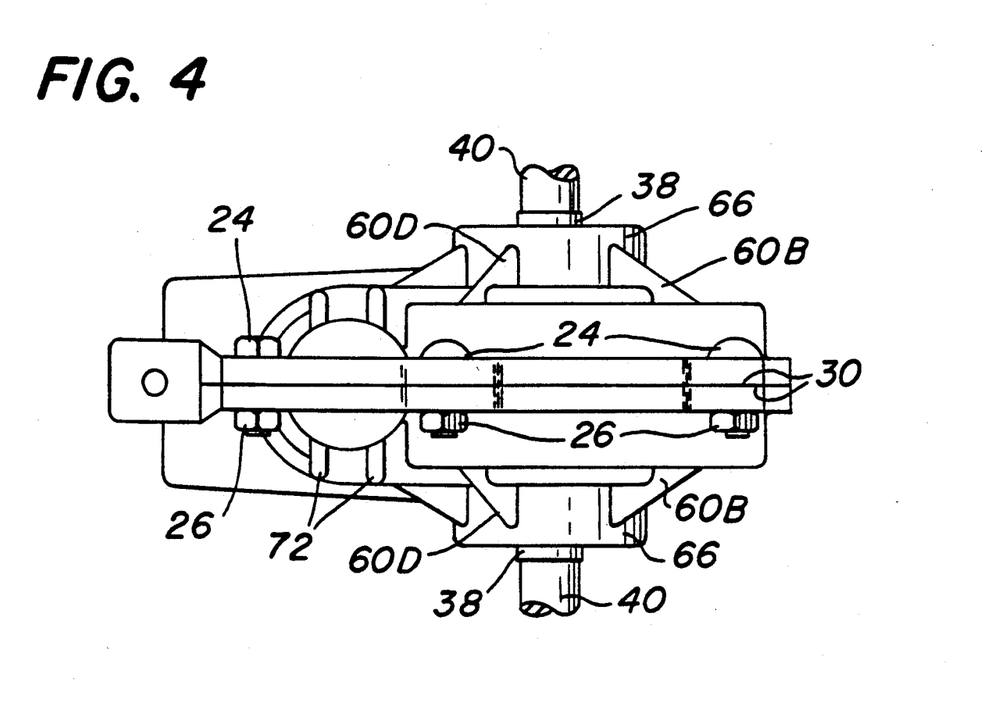
FIG. 4 is the bottom plan view of the transmission housing shown in FIG. 1.

As can be seen in FIGS. 1 and 3, the upper end of the housing 20 is used to mount the handle bars 76 of the rototiller thereon. In particular, a transverse or horizontal groove 78 is provided in each of the housing sections 22A and 22B at the upper end thereof. Each groove 78 is of semi-circular shape (FIG. 3) so that it can receive therein the circular cross-section of the lower portion of its respective handle bar 76. The end of the groove at the front of the transmission housing includes a stop 80. This stop 80 is provided to ensure the handle bars 76 are mounted in the appropriate direction with respect to the transmission housing. In this regard, the handle bars 76 are arranged to be mounted so that they extend backward in a direction opposite to the direction of rotation of the tined blades. The blades are shown by the phantom line 82 in FIG. 1 and the direction of the rotation of those blades is designated by the arrow 82A in FIG. 1. By placing the stops 80 at the forward end of the grooves 78, one ensures that the handle bars 76 when mounted on the housing assembly by the user of the device are oriented such that they extend backward. This is of importance for operator safety to insure that the rototiller will tend to pull away from the operator rather than move toward him/her.

Figure 5:
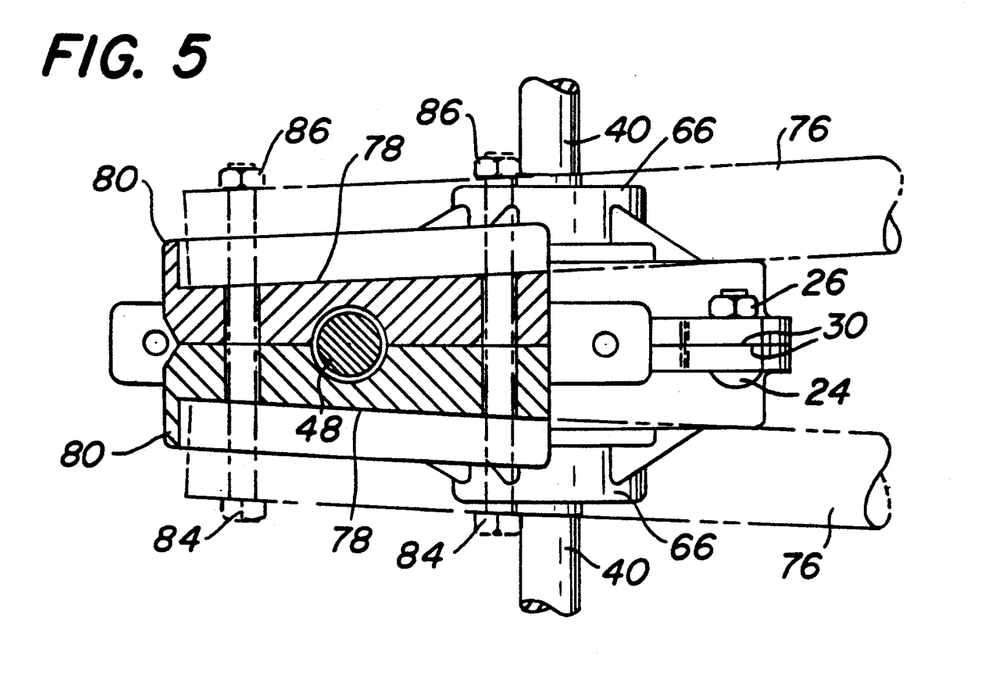
FIG. 5 is a sectional view taken along line 5—5 of FIG. 1.

The securement of the lower ends of the handle bars 76 in these respective grooves 78 is effected by means of bolts 84 extending through aligned openings in the handle bars 76 and in the upper end of the two transmission housing sections. The bolts 84 are held in place by respective nuts 86 (FIG. 5).

In FIG. 7 the details of the various seals for the axle 40 are shown. In particular, the roller bearing 38 is mounted within the central opening 36 in both the left housing section 22A and right housing section 22 to facilitate the axle 40 rotation. Located within the opening 36 and immediately adjacent the roller bearing 38 is a lip seal 88 to prevent grease 100 leakage. This lip seal 88 is held or trapped in place by a retaining ring 90, also located within the opening 36.

As mentioned previously, although the two housing sections are virtually identical, there are some differences. One difference is that two grease injection ports 92 and 94 with associated threaded plugs (not shown) are provided in the right housing section 22B, but not in the left housing section 22A. The location of these ports and plugs are indicated by the phantom lines in FIG. 1. The ports 92 and 94 and the associated threaded plugs for sealing the ports are provided to enable the user to insert grease into the housing 20, if desired.

Another difference between the two housing sections 22A and 22B is that the counterbore 96 (FIG. 6) is located on the engagement surface 30 of the left housing section 22A only. There is a raised boss (not shown) located at the corresponding location on the right housing section 22B's engagement surface 30. This raised boss mates with the counterbore 96 in the left housing section 22B in order to align the housing sections 22A and 22B during assembly.

The rototiller's engine is mounted on the housing 20 via a pair of mounting brackets 110 and 112. These brackets are provided only on the housing section 22A. The rototiller engine, only a portion of which, 106 (FIG. 1), is shown includes a bell housing which is connected to the clutch within the motor. A hex head 104, which forms the top end of the drive shaft 48, fits into the bell housing.

Without further elaboration, the foregoing will so fully illustrate the invention that others may, by applying current or future knowledge, adopt the same for use under various conditions of service.

I claim:

1. A rototiller for tilling soil comprising:

a plurality of tines;

transmission means connected to said tines; and motor means mounted on said transmission means and operatively connected thereto for rotating said transmission means and said tines connected thereto;

said transmission means being comprised of:

a pair of die cast housing sections, each section having inner and outer surfaces and each of said sections having a plurality of strengthening and heat dissipating ribs projecting from said outer surface thereof and intersecting one another over a substantial portion of each housing section, said inner surfaces of said housing sections each terminating in a peripheral engagement surface, said peripheral engagement surfaces confronting each other and one of said peripheral engagement surfaces having a groove extending the length thereof, gasket means disposed within said groove and extending along the entire length of said peripheral engagement surface between said confronting engagement surfaces of said housing sections, fastening means releasably securing said housing sections to each other, whereby fastening said housing members together seals said members along said peripheral engagement surfaces with said gasket means thereinbetween and creates an interior chamber between said housing members, a rotatable drive shaft operatively connected to said motor and rotatable thereby, said drive shaft extending into said interior chamber between said housing sections, a worm shaft connected to said drive shaft within said interior chamber, said worm shaft being rotatable by said drive shaft, a worm gear within said interior chamber engageable with said worm shaft and rotatable in response to rotation of said worm shaft, axle means connected to worm gear and rotatable therewith, said axle means extending through said housing sections and having said tines mounted thereon, and lubrication material within said interior chamber.

2. A rototiller as claimed in claim 1, wherein said housing sections each have a recess in said outer surface thereof, and each of said recesses has a stop surface at one end thereof; and said rototiller is further comprised of handle bars mounted within said recesses and abutting said stop surfaces.

3. A rototiller as claimed in claim 1, wherein said gasket means is a preformed O-ring.

4. A rototiller as claimed in claim 1, wherein said housing sections are comprised of die cast aluminum.

5. A motor operated rotating apparatus comprising: rotatable transmission means; and motor means mounted on said transmission means and operatively connected thereto for rotating said transmission means, said transmission means being comprised of:

a pair of die cast housing sections, each section having inner and outer surfaces and each of said sections having a plurality of strengthening and heat dissipating ribs projecting from said outer surface thereof and intersecting one another over a substantial portion of each housing section, said inner surfaces of said housing sections each terminating in a peripheral engagement surface, said peripheral engagement surfaces confronting each other and one of said peripheral engagement surfaces having a groove extending the length thereof, gasket means disposed within said groove and extending along the entire length of said peripheral engagement surface between said confronting engagement surfaces of said housing sections, fastening means releasably securing said housing sections to each other, whereby fastening said housing members together seals said members along said peripheral engagement surfaces with said gasket means thereinbetween and creates an interior chamber between said housing members, a rotatable drive shaft operatively connected to said motor and rotatable thereby, said drive shaft extending into said interior chamber between said housing sections, a worm shaft connected to said drive shaft within said interior chamber, said worm shaft being rotatable by said drive shaft, a worm gear within said interior chamber engageable with said worm shaft and rotatable in response to rotation of said worm shaft, axle means connected to worm gear and rotatable therewith, said axle means extending through said housing sections, and lubrication material within said interior chamber.

6. A motor operated rotating apparatus as claimed in claim 5, wherein said housing sections each have a recess in said outer surface thereof, and each of said recesses has a stop surface at one end thereof; and said apparatus is further comprised of handle bars mounted within said recesses and abutting said stop surfaces.

7. A motor operated rotating apparatus as claimed in claim 5, wherein said gasket means is a preformed O-ring.

8. A motor operated rotating apparatus as claimed in claim 5, wherein said housing sections are comprised of die cast aluminum.

9. A motor operated rotating apparatus as claimed in claim 5, further comprising tines mounted on said axle means extending through said transmission means.

* * * * *